United States Patent [19]

Bonde

[11] Patent Number: 5,067,449

[45] Date of Patent: Nov. 26, 1991

[54] FITTED CRANKCASE BREATHER VALVE ASSEMBLY

[75] Inventor: Kevin G. Bonde, Kiel, Wis.

[73] Assignee: Tecumseh Products Company, Tecumseh, Mich.

[21] Appl. No.: 684,222

[22] Filed: Apr. 12, 1991

[51] Int. Cl.$^5$ ............................................. F01M 13/02
[52] U.S. Cl. .................. 123/41.86; 123/572; 137/854
[58] Field of Search ............... 123/41.86, 572, 574, 123/196 W; 137/854; 251/365

[56] References Cited

U.S. PATENT DOCUMENTS

| | | | |
|---|---|---|---|
| 2,571,893 | 11/1949 | Kendall | 136/178 |
| 3,941,149 | 3/1976 | Mittleman | 137/493.1 |
| 3,983,857 | 10/1976 | O'Connor | 123/187.5 |
| 4,169,432 | 10/1979 | White | 123/41.86 |
| 4,470,389 | 9/1984 | Mitadera et al. | 123/196 |
| 4,549,520 | 10/1985 | Tamba et al. | 123/572 |
| 4,579,092 | 4/1986 | Kandler | 123/41.86 |
| 4,677,447 | 6/1987 | Nielsen | 346/140 R |
| 4,711,224 | 12/1987 | Eckhardt | 123/572 |

*Primary Examiner*—Noah P. Kamen
*Attorney, Agent, or Firm*—Baker & Daniels

[57] ABSTRACT

A crankcase breather assembly for an internal combustion engine. A breather passage is provided in the crankcase for communication of combustion gases out from the crankcase interior and includes an annular recess defining a shoulder having a corner edge. A valve assembly is disposed in the passage for intermittently permitting the expulsion of gases from the crankcase interior through the passage. The valve assembly includes a valve seat portion connected with a flexible breather valve. The valve seat portion includes a locking portion disposed at least partially within the annular recess and forms an interference fit therein, and extending axially beyond the corner edge such that the corner edge positively locks the valve seat within the passage.

12 Claims, 1 Drawing Sheet

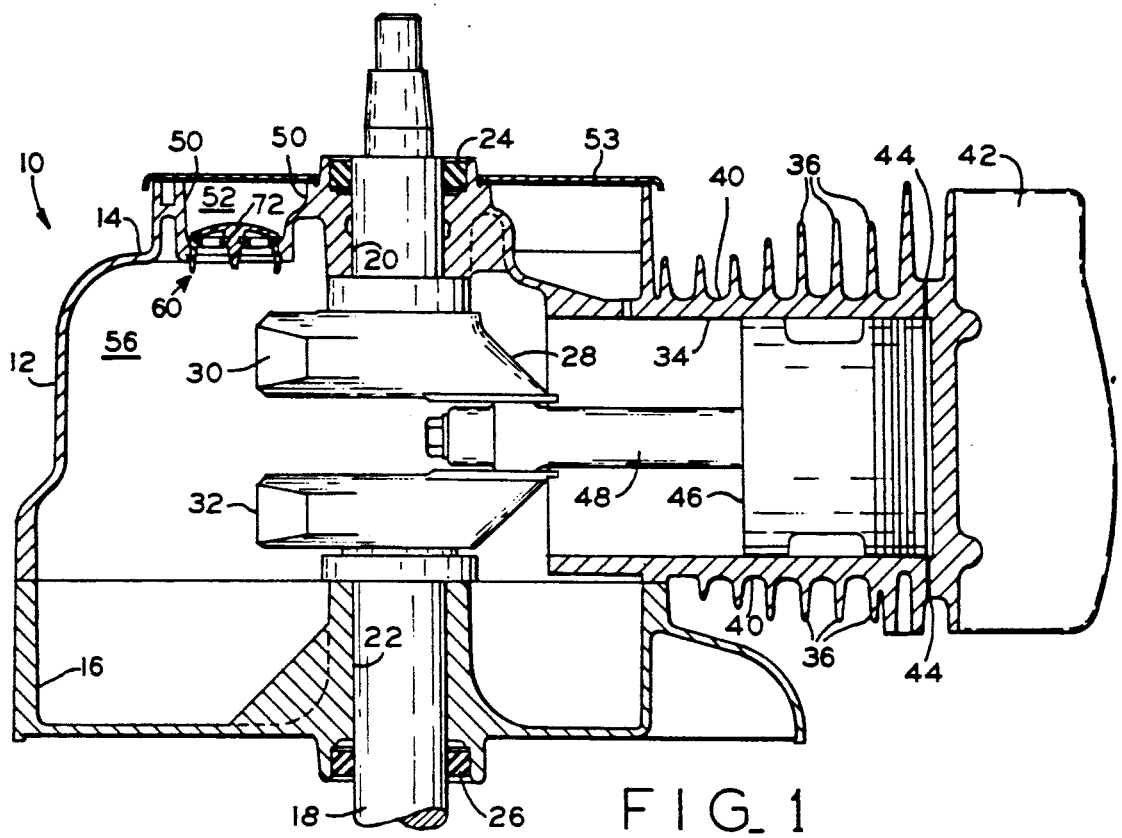
FIG_1
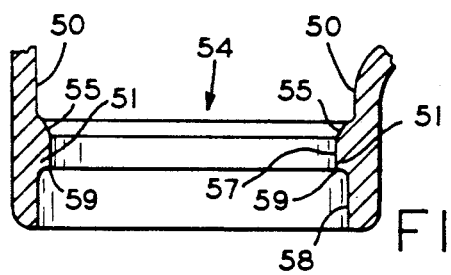
FIG_3
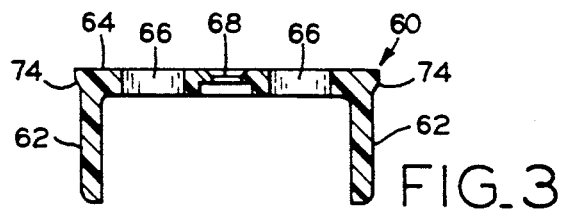
FIG_2
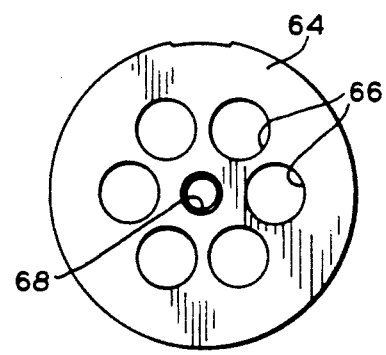
FIG_4
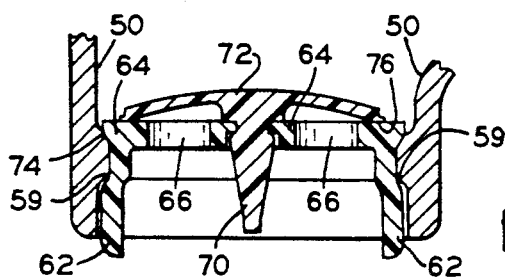
FIG_5

FITTED CRANKCASE BREATHER VALVE ASSEMBLY

BACKGROUND OF THE INVENTION

The present invention relates generally to internal combustion engines, and more particularly, to such an engine having a breather chamber for venting of crankcase gases.

The crankcase of an air-cooled internal combustion engine is sealed from the combustion chamber by the piston rings. These engines sometimes have a crankcase breather system for venting "blow-by" gases which get by the piston rings and valve stem seals and enter the crankcase. The breather system vents these gases to maintain a negative crankcase pressure so that lubrication oil is not forced pass the oil seals by the internal crankcase pressure. Such a breather system often involves a check valve which allows gases to exit the crankcase when the piston is moving toward its bottom dead center position and will close to prevent air from entering the crankcase.

Conventional breather valves include a reed-type valve in which a flexible metal strip is positioned over an opening in the crankcase. The reed opens on the downward piston stroke when the pressure differential between the atmosphere and the crankcase is sufficient to overcome the spring tension of the reed. A second type of valve is a disc-type valve that is generally made of a lightweight metal or plastic and moves perpendicular to an opening in the crankcase. The disc is spring biased or gravity biased to a closed position and opens to cover the opening in response to pressure changes. A third type of valve is a molded flexible valve, commonly called a "mushroom" or "umbrella" valve. This valve has a center stem for attachment to a valve seat and covers a circular pattern of holes in the closed position. When crankcase pressure builds, the valve will flex upwardly to uncover the openings and vent the gases.

In one method of installing a flexible breather valve to a crankcase, a molded plastic cup is provided and sits in an opening in the crankcase. The cup includes a molded flange at the top of the cup and the necessary valve openings in the bottom of the cup. A gasket and metal cover is used to retain the cup/valve assembly and to seal the cup, which is held in place by several screws.

Another method of installing a flexible breather valve includes machining the necessary holes into the wall of the cylinder itself and assembling the breather valve directly to the cylinder. However, two problems arise with this method. First, the surface necessary for proper valve installation and sealing requires machining of the cylinder casting at additional cost. Second, the metal cylinder wall provides a direct path for the transfer of engine heat to the valve, thus promoting valve degradation. In addition, the small openings required for valve function are relatively difficult to cast in place, and would probably have to be machined.

A further method of installing a breather valve is to press and secure the valve seat into an opening in the cylinder block. If the seat is composed of metal, a press fit between the seat and cylinder block should be sufficient for retention and sealing. However, the metal seat provides a direct path for engine heat during engine operation, thereby promoting degradation of the valve retaining stem. Such a problem may be overcome by utilizing a plastic seat; however, the high temperature environment quickly causes the press fit between the seat and the cylinder to disappear due to plastic creep, thereby necessitating the use of some type of mechanical retention, such as staking the surrounding metal over the seat at additional cost.

It is desired to provide an improved flexible breather valve assembly which can be securely and reliably installed and retained without the use of separate fasteners or fastening methods.

SUMMARY OF THE INVENTION

The present invention provides an improved flexible breather valve assembly for an internal combustion engine, wherein a breather passage is formed in the crankcase and is configured with a sharp corner edge therein. A molded plastic valve seat is press fit within the breather passage and includes a locking portion which, under operating temperatures of the engine, will deform to the shape of the passage and form an interference fit therein such that the corner edge prevents the valve seat from moving axially out of the passage under operating conditions.

Generally, the invention provides, in one form thereof, a breather valve assembly for an internal combustion engine in which the breather passage in the crankcase includes an annular recess defining a shoulder having a corner edge. A plastic valve seat extends through the annular recess and forms an interference fit therein, such that a portion of the valve seat is unable to move axially out of the passage due to the interference of the edge.

An advantage of the breather assembly of the present invention is that the valve seat is reliably retained and sealed in the breather passage of the cylinder block without use of fasteners or secondary mechanical retention devices.

Another advantage of the breather assembly of the present invention is that a tight permanent seal is formed between the valve seat and the breather passage wall upon engine operation.

A further advantage of the breather assembly of the present invention is that a corner edge is formed with the breather passage so that the valve seat extending through the passage and deforming under the heat from engine operating conditions forms an interference fit within the passage thereby preventing axial movement of the valve seat out of the passage.

A still further advantage of the breather assembly of the present invention is that a stop flange is molded into the valve seat for providing a physical stop when the seat is installed in the breather passage.

The present invention, in one form thereof, provides an internal combustion engine having a crankcase and a crankcase interior. A crankcase breather assembly is provided for the expulsion of combustion gases from the crankcase interior. The assembly includes a breather passage in the crankcase for providing communication of gases out from the crankcase interior. The passage includes an annular recess defining a shoulder having a corner edge. The assembly further includes a valve assembly for intermittently permitting the expulsion of gases from the crankcase interior. The valve assembly includes a plastic valve seat portion connected with a flexible breather valve. The valve seat portion includes a locking portion extending through the annular recess and forming an interference fit therein so that the corner edge positively locks the valve seat within the passage.

The invention further provides, in one form thereof, a method of assembling a crankcase breather assembly in an internal combustion engine having a crankcase interior. A passage in the crankcase is provided and includes an annular recess defining a shoulder having a corner edge. A valve seat is introduced into the passage so that a locking portion is disposed at least partially within the annular recess forming an interference fit therein. The valve seat also extends through the annular recess such that the corner edge positively locks the valve seat within the passage. A flexible breather valve member is attached to the valve seat.

BRIEF DESCRIPTION OF THE DRAWINGS

FIG. 1 is an elevational cross-sectional view of an internal combustion engine and particularly showing the breather valve assembly in accordance with the principles of the present invention;

FIG. 2 is an enlarged sectional view of the breather passage of FIG. 1;

FIG. 3 is an enlarged sectional view of the valve seat of the breather valve assembly of FIG. 1;

FIG. 4 is a top view of the valve seat of FIG. 3; and

FIG. 5 is a view of the valve seat of FIG. 3 installed in the passage of FIG. 2.

DESCRIPTION OF THE PREFERRED EMBODIMENT

Referring to FIG. 1, there is illustrated an internal combustion engine 10 in accordance with the present invention. Engine 10 includes a crankcase 12 having a generally horizontal top wall 14, an oil sump 16, and a vertically oriented crankshaft 18 journalled for rotation therein at bearing journals 20 and 22. A top seal 24 and a bottom seal 26 provide sealing of crankshaft 18 with respect to crankcase 12 to prevent migration of oil therepast. Crankshaft 18 includes a crank 28 and counterweights 30 and 32. Horizontally oriented cylinder bore 34 communicates with crankcase 12 and extends therefrom. Cooling fins 36 on the outside of cylinder 40 provide for dissipation of heat. Cylinder head 42 is attached to the top of cylinder 40 and sealed thereto by gasket 44, thereby closing the top of cylinder bore 34. Received within cylinder bore 34 is piston 46 arranged for reciprocation therein. Piston 46 is linked to crank 28 of crankshaft 18 by connecting rod 48.

Arranged on the top of top wall 14 and extending upwardly therefrom is an upstanding wall 50 which circumscribes and defines a breather chamber 52. Wall 50 is preferably cast integrally with top wall 14 which is likewise cast integrally with crankcase 12. Chamber 52 is closed at the top by a removable cover plate 53 and corresponding sealing gasket (not shown). Further details of engine 10 are disclosed in U.S. Pat. No. 4,926,814, assigned to the assignee of the present invention and incorporated herein by reference. Although engine 10 has been described as having a vertical crankshaft, it is understood that the present invention also pertains to internal combustion engines having horizontal crankshafts.

Referring now to FIG. 2, a breather passage 54 is disposed through top wall 14 for communicating the interior 56 of crankcase 12 with breather chamber 52. Passage 54 may be cast or machined with a mating surface 55 for determining maximum press depth. Preferably, passage 54 is machined for better control of tolerances for the press fit and for providing a sharp edge within the passage. Passage 54 includes a first diameter portion 57 and an annular recess or second diameter portion 58. A shoulder 51 having a sharp corner edge 59 is defined where first portion 57 ends and recess 58 abruptly begins, as shown in FIG. 2.

Referring to FIG. 3, there is shown a breather valve seat 60 generally comprising a downwardly extending locking portion 62 and an integrally formed circular top portion 64. Top 64 includes a plurality of small circular exhaust gas openings 66 and a central stem opening 68 which receives stem 70 of movable valve member 72. Valve seat 60 is preferably made from a lowcost engineering grade thermoplastic such as nylon to provide accurate dimensions and a smooth flat surface for proper valve action and sealing. Valve seat 60 further includes a flange or chamfer 74 which engages and is stopped by mating surface 55 of wall 50 upon installation of valve seat 60 to ensure proper valve seat depth.

A press fit, preferably of about 0.020–0.030 per inch in diameter is used to install valve seat 60 into breather passage 54 as shown in FIG. 5. More specifically, an upper region of locking portion 62 is pressed through first diameter portion 57 until chamfer 74 engages mating surface 55. The lower region of locking portion 62, i.e. the region extending downwardly from first diameter portion 57 has clearance with recess 58 so that this lower region "expands" into recess 58. Upon being initially subjected to operating temperatures of the engine, this lower region of locking portion 62 permanently distorts to prevent upward movement thereof. In addition, the region of locking portion 62 under stress, i.e. the region engaging first diameter portion 57, deforms and creeps to assume the shape of the passage so engaged, but still retains enough interference to provide sufficient seal to prevent gases from escaping through passage 54 between wall 50 and seat 60. The region of locking portion 62 not under stress, i.e. the region axially beyond the press fit extending into crankcase interior 56, does not shrink and remains radially beyond diameter portion 57 and corner edge 59. Thus, sharp corner edge 59 positively locks valve seat 60 into passage 54 by preventing the lower region of leg portion 62 from moving axially upwardly out of second diameter portion 58.

Again referring to FIG. 5, flexible breather valve 72 assumes an umbrella shape and initially sealingly engages the top surface of top portion 64 at a point of radial engagement 76, which is radially outward of openings 66 so that valve 72 prevents communication between crankcase interior 56 and breather chamber 52. As combustion gases build up in the crankcase, the pressure forces flexible valve 72 to "open" or flex upwardly away from top portion 64 at 76, thereby providing communication between crankcase interior 56 and breather chamber 52 via openings 66. Breather chamber 52 has a vent opening through which crankcase gases are vented either to the atmosphere or through a conduit to the intake of the combustion air induction system. Once pressure is released from crankcase interior 56, valve 72 again "closes", i.e. engages top 64 at 76, to prevent air from entering crankcase interior 56.

It will be appreciated that the foregoing is presented by way of illustration only, and not by way of any limitation, and that various alternatives and modifications may be made to the illustrated embodiment without departing from the spirit and scope of the invention.

What is claimed is:

1. In an internal combustion engine including a crankcase having a crankcase interior, a crankcase breather assembly for expulsion of combustion gases from the crankcase interior, comprising:
   breather passage means in the crankcase for providing communication of gases out from the crankcase interior, said passage means including an annular recess defining a shoulder having a corner edge; and
   valve means for intermittently permitting the expulsion of gases from the crankcase interior, said valve means including a valve seat portion connected with a flexible breather valve, wherein said valve seat portion includes a locking portion disposed at least partially within said annular recess and forming an interference fit therein, whereby said corner edge positively locks said valve seat within said passage means.

2. The engine according to claim 1, wherein said crankcase breather assembly includes means for limiting the extent of axial movement of said locking portion into said breather passage means.

3. The engine according to claim 2, wherein said valve seat includes a flanged upper portion in contacting engagement with a mating shoulder portion of said annular recess for limiting the extent of axial movement of said locking portion into said breather passage means.

4. The engine according to claim 1, wherein a lower region of said locking portion extends radially outwardly of said corner edge.

5. The engine according to claim 1, wherein said valve seat is made of a thermoplastic material.

6. The engine according to claim 1, wherein a portion of said locking portion axially extends into the crankcase interior.

7. In an internal combustion engine including a crankcase having a crankcase interior, a crankcase breather assembly for expulsion of combustion gases from the crankcase interior, comprising:
   breather passage means in the crankcase for providing communication of gases out from the crankcase interior, said passage means including an annular recess defining a shoulder having a corner edge;
   valve means for intermittently permitting the expulsion of gases from the crankcase interior, said valve means including a valve seat portion connected with a flexible breather valve, wherein said valve seat portion includes a locking portion disposed at least partially within said annular recess and forming an interference fit therein, wherein a lower region of said locking portion extends axially into the crankcase interior and radially outwardly of said corner edge, whereby said corner edge positively locks said valve seat within said passage means; and
   means for limiting the extent of axial movement of said locking portion into said breather passage means.

8. The engine according to claim 7, wherein said valve seat includes a flanged upper portion in contacting engagement with a mating shoulder portion of said annular recess for limiting the extent of axial movement of said locking portion into said breather passage means.

9. The engine according to claim 7, wherein said valve seat is made of a thermoplastic material.

10. In an internal combustion engine having a crankcase interior, a method of assembling a crankcase breather assembly for expulsion of combustion gases from the crankcase interior, the method comprising the steps of:
    providing a passage in the crankcase, said passage having an annular recess defining a shoulder having a corner edge;
    inserting a valve seat into said passage so that a locking portion of said valve seat is disposed at least partially within said annular recess and forms an interference fit therein and extends axially beyond said corner edge, whereby said corner edge positively locks said valve seat within said passage; and
    attaching a flexible breather valve to said valve seat.

11. The method of assembling a crankcase breather assembly according to claim 10, and further comprising the step of heat deforming said locking portion by engine heat after introducing said valve seat into said passage, thereby causing said locking portion to assume generally the shape of said passage.

12. The method of assembling a crankcase breather assembly according to claim 10, wherein said valve seat includes a flanged upper portion and an annular wall defines said annular recess and includes a mating shoulder portion, wherein the step of introducing said valve seat into said passage includes inserting said valve seat into said passage until said flanged upper portion engages said mating shoulder portion, whereupon said mating shoulder portion prevents any further insertion of said valve seat into said passage.

* * * * *